United States Patent [19]

Mitchell et al.

[11] Patent Number: 5,497,491
[45] Date of Patent: Mar. 5, 1996

[54] SYSTEM AND METHOD FOR IMPORTING AND EXPORTING DATA BETWEEN AN OBJECT ORIENTED COMPUTING ENVIRONMENT AND AN EXTERNAL COMPUTING ENVIRONMENT

[75] Inventors: Herman Mitchell, Lithonia, Ga.; William L. Rich, Charlotte, N.C.; Floyd W. Shackelford, Beauford, Ga.

[73] Assignee: International Business Machines Corporation, Armonk, N.Y.

[21] Appl. No.: 9,592

[22] Filed: Jan. 26, 1993

[51] Int. Cl.$^6$ .............................. G06F 9/44; G06F 15/16
[52] U.S. Cl. ................. 395/700; 395/600; 364/DIG. 1; 364/280; 364/284; 364/284.3; 364/284.4
[58] Field of Search ..................................... 395/700, 500, 395/600, 200

[56] References Cited

U.S. PATENT DOCUMENTS

| | | | |
|---|---|---|---|
| 4,989,132 | 1/1991 | Mellender et al. | |
| 5,075,848 | 12/1991 | Lai et al. | |
| 5,095,522 | 3/1992 | Fujita et al. | |
| 5,133,068 | 7/1992 | Crus et al. | |
| 5,133,075 | 7/1992 | Risch. | |
| 5,151,987 | 9/1992 | Abraham et al. | |
| 5,161,223 | 11/1992 | Abraham. | |
| 5,161,225 | 11/1992 | Abraham et al. | |
| 5,212,787 | 5/1993 | Baker et al. | 395/600 |
| 5,261,080 | 11/1993 | Khoyi et al. | 395/500 |
| 5,265,206 | 11/1993 | Shackelford et al. | 395/200 |
| 5,327,559 | 7/1994 | Priven et al. | 395/700 |

OTHER PUBLICATIONS

A standard method for creating self-defining data structures for information Archive and Transfer; John A. Johnson, Federic C. Billingsley, 1990 10th IEEE Symposium.
Interoperability of Heterogeneous database with Schematic d., Interoperability in Multidatabase system, 1991, workshop., IEEE/IEE publication.

*Primary Examiner*—Kevin A. Kriess
*Assistant Examiner*—Majid A. Banankhah
*Attorney, Agent, or Firm*—Bell, Seltzer, Park & Gibson

[57] ABSTRACT

A system and method for importing and exporting data between an object oriented computing environment and an external computing environment encapsulates the validation, conversion, and update control mechanisms for objects in metadata about the objects. Metadata logic operates identically on a variety of internal objects, freeing the object oriented computing environment from the need to duplicate the same control logic for each user interface. During program generation, metadata objects are generated to link an external computing environment data field name, a corresponding object oriented computing environment attribute name and a corresponding external data format for each external data field which is imported and exported. An external class object is defined, including conversion parameters for converting the corresponding object oriented computing environment attribute into the corresponding external data format. External object class metadata objects contain the object oriented computing environment attributes which are used for import and export.

20 Claims, 9 Drawing Sheets

FAMILY
```
MOM: PERSON;
DAD: PERSON;
```
　　　CONTAINS
　　　　PERSON
```
BIRTH_DATE: DATE;
SOC_SEC_NUM: LONG;
PHONE_NUMBER: PHONE;
```
　　　　　　CONTAINS
　　　　　　　DATE
```
DATE_NUM: LONG;
CALENDAR: SHORT;
FORMAT: LONG;
```

FIG. 8A.

AND
　　　　　　　PHONE
```
AREA_CODE: STRING;
PHONE_NUMBER: STRING;
EXTENSION: STRING;
```

| EXTERNAL NAME | INTERNAL NAME | VALUE |
|---|---|---|
| MOM'S BIRTHDAY DATE NUM | MOM.BIRTH_DATE.DATE_NUM | 123456 |
| MOM'S BIRTHDAY CALENDAR | MOM.BIRTH_DATE.CALENDAR | 5 |
| MOM'S BIRTHDAY FORMAT | MOM.BIRTH_DATE.FORMAT | 654 |
| MOM'S SOCIAL SECURITY NUMBER | MOM.SOC_SEC_NUM | 123456789 |
| MOM'S AREA CODE | MOM.PHONE_NUMBER.AREA_CODE | 404 |
| MOM'S PHONE NUMBER | MOM.PHONE_NUMBER.PHONE_NUM | 456-7890 |
| DAD'S BIRTHDAY DATE NUM | DAD.BIRTH_DATE.DATE_NUM | 234567 |
| DAD'S BIRTHDAY CALENDAR | DAD.BIRTH_DATE.CALENDAR | 5 |
| DAD'S BIRTHDAY FORMAT | DAD.BIRTH_DATE.FORMAT | 654 |
| DAD'S SOCIAL SECURITY NUMBER | DAD.SOC_SEC_NUM | 564321876 |
| DAD'S AREA CODE | DAD.PHONE_NUMBER.AREA_CODE | 404 |
| DAD'S PHONE NUMBER | DAD.PHONE_NUMBER.PHONE_NUM | 678-2345 |
| | DAD.PHONE_NUMBER.EXTENSION | 123 |

FIG. 8B.

| EXT. NAME ORDER | DATA_LIST ENTRIES | | | | INT. NAME ORDER |
|---|---|---|---|---|---|
| INDEX | INDEX | EXT. NAME | INT. NAME | VALUE | INDEX |
| 3 | 1 | FRED | APPLE | 123 | 1 |
| 1 | 2 | SALLY | PEAR | 456 | 4 |
| 5 | 3 | BOB | PEACH | 789 | 5 |
| 2 | 4 | TED | BANANA | 234 | 3 |
| 4 | 5 | JIMMY | KIWI | 567 | 2 |

FIG. 9.

SYSTEM AND METHOD FOR IMPORTING AND EXPORTING DATA BETWEEN AN OBJECT ORIENTED COMPUTING ENVIRONMENT AND AN EXTERNAL COMPUTING ENVIRONMENT

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented computing environments are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object.

Each defined object will usually be manifested in a number of "instances". Each instance contains the particular data structure for a particular example of the object. In An object oriented computing environment, data is processed by requesting an object to perform one of its methods by sending the object a "message". The receiving object responds to the message by choosing the method that implements the message name, executing this method on the named instance, and returning control to the calling high level routine along with the results of the method.

As object oriented computing environments proliferate, it becomes increasingly important to allow import and export of data between the object oriented computing environment and an external computing environment. The external computing environment may be a conventional functionally programmed computing environment or may be another object oriented computing environment. Typical interfaces between an object oriented environment and an external environment may include an interactive host user interface, a batch interface, a remote work station user interface, or other well known interfaces between computing environments.

In importing and exporting data between an object oriented computing environment and an external computing environment, an interface is typically defined and generated between the object oriented computing environment and the external computing environment. The interface will contain mechanisms for validating the imported and exported data, and for converting the imported and exported data to a form which is usable by the importing or exporting system. As the number of interfaces proliferate, the data importing and exporting mechanisms must be duplicated and customized for each type of interface. The need to generate and maintain a separate user interface adds to program complexity and cost and increases the possibility of errors.

SUMMARY OF THE INVENTION

It is therefore an object of the present invention to provide an improved object oriented computing environment.

It is another object of the invention to provide an object oriented computing environment including a system and method for exporting and importing data to and from other computing environments.

It is yet another object of the present invention to provide a common external interface to objects within an object oriented environment.

These and other objects are provided, according to the present invention, by encapsulating the validation, conversion and update control mechanisms for objects in "metadata" about the objects. This encapsulation allows metadata logic to operate identically on a variety of internal objects, freeing the object oriented computing environment from the need to duplicate the same control logic for each user interface. By using a tagging scheme, which modifies the attributes of an object to define the conversion and validation parameters for importing and exporting data, the form and context in which data is imported and exported can be generally defined. Separate interfaces for communicating between the object oriented computing environment and each external computing environment are therefore not required. Logic to convert and validate input to an object is needed only when special conversion techniques or validations are required for an imported attribute.

In particular, a system for importing and exporting data between an external computing environment and an object oriented computing environment includes datalist generating means which operates during program generation (build time), to generate datalist objects which list an external computing environment data field name, a corresponding object oriented computing environment internal attribute name, and a corresponding external data format for each external data field in the external computing environment which is imported and exported between the object oriented computing environment and the external computing environment. An external object class is defined, including conversion parameters for converting the corresponding object oriented computing environment attribute into the corresponding external data format. The external object class frames, referred to as "metadata", contain the object oriented computing environment attributes which are used for import and export. Metadata generating means is also provided, for generating, at program generation time, a metadata object as a subclass of the external object class, for each object in the object oriented environment which includes one of the corresponding object oriented computing environment attributes.

During program execution (run time), importing means is responsive to a request from the external computing environment to import external data into the object oriented computing environment. The importing means generates a datalist object, identifies an object oriented computing environment attribute from the datalist object and identifies a corresponding metadata object. The importing means applies the conversion parameters in the corresponding metadata object to the external data, to thereby convert the external data into object oriented data. The importing means places the object oriented data into the corresponding data object which is associated with the corresponding metadata object.

Also during program execution, exporting means is responsive to a request from the object oriented computing environment to export data from an object in the object oriented computing environment to the external computing environment. The exporting means and reads the external data name corresponding to the metadata object from the datalist and identifies an internal name from the datalist. The corresponding metadata object is then identified. The exporting means applies the conversion parameters in the corresponding metadata object to the data from the object, to thereby convert the object oriented data into external data. The external data is formatted into the specific format required by the external computing environment.

During program generation, the method according to the present invention generates the metadata objects as described above so that the object oriented computing environment is capable of responding to import and export requests during execution. During execution, data is imported into the object oriented system by reading the external name and values, generating a datalist object identifying an attribute from the datalist and identifying the corresponding metadata object, and by applying the conversion parameters in the metadata object to the identified data, to thereby convert the external data into object oriented data. The object oriented data is placed into the data object which is associated with the metadata object.

In order to export data to an external environment, the internal name is identified from the datalist and the internal name identified from the datalist. The corresponding metadata object is identified. The conversion parameters in the metadata object are applied to the data from the object to thereby convert the object oriented data into external data. Accordingly, the conversion and validation rules and methods are built into the object oriented computing environment so that rules and methods do not need to be generated for each new external environment which is to communicate with the object oriented environment. Interfaces to new external environments may be added and changed easily with minimal new programming generation and minimal possibility of error.

BRIEF DESCRIPTION OF THE DRAWINGS

FIGS. 8A and 8B illustrate an example object and a datalist frame for the example object, respectively.

FIG. 9 illustrates a preferred embodiment of a datalist frame.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system and method for importing and exporting data according to the present invention, a general overview of object oriented computing environments will be provided. A general description of the system and method of the present invention will then be provided, followed by a detailed design description for the system and method for importing and exporting data according to the present invention.

Object Oriented Computing Environment

In an object oriented computing environment, work is accomplished by sending action request messages to an object which contains data. The object will perform the requested action on the data according to its predefined methods. Objects may be grouped into object classes which define the types and meanings of the data, and the action requests (messages) that the objects in the class will honor. The individual objects containing data are called "instances" of the object. Object classes are defined to be subclasses of other classes. Subclasses inherit all of the data characteristics and methods of the parent class. They can add additional data and methods and they can override or redefine any data elements or methods of the parent class.

An object or object class is typically represented schematically by a ring in which the center of the ring contains the frame (data structure) having slots, each of which contains an attribute of the data in the slot. Sectors of the ring are used to indicate the object's methods which encapsulate the frame and may be used to perform actions on the data encapsulated in the frame of object instances.

Figure 1:
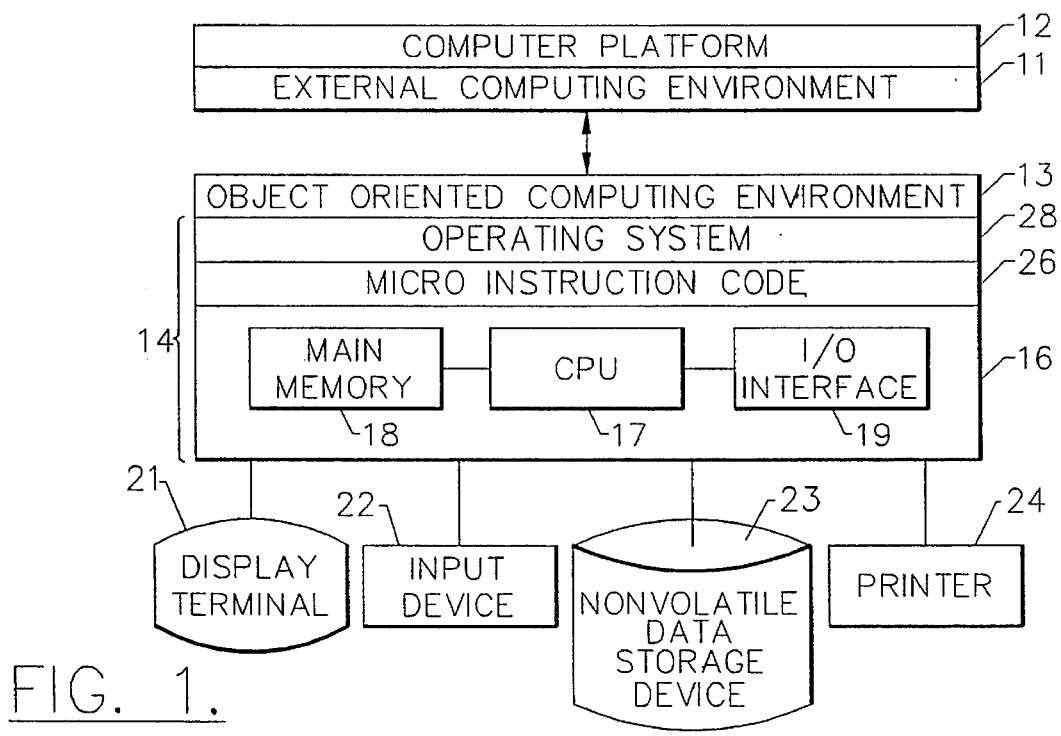
FIG. 1 illustrates a block diagram of an object oriented computing environment, an external computing environment and their associated hardware platforms.
Figure 2:
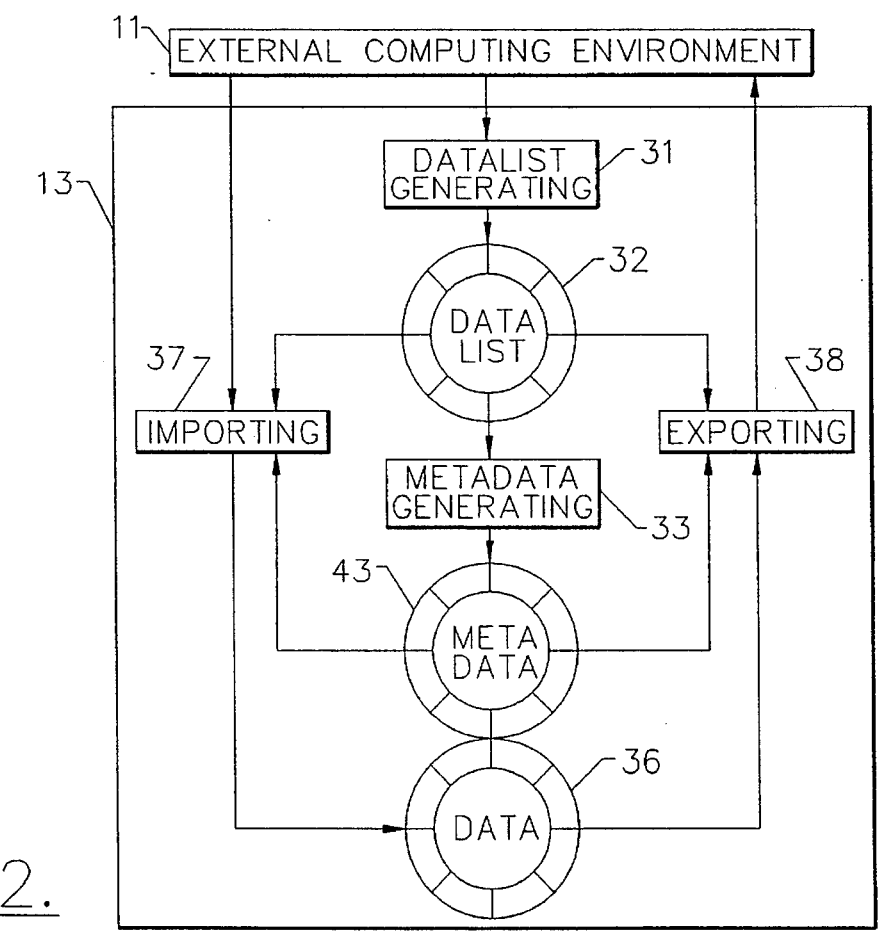
FIG. 2 illustrates a block diagram of a system for importing and exporting data according to the present invention.

Referring now to FIG. 1, the hardware and software environment in which the present invention operates will now be described. As shown in FIG. 2, the present invention is a method and system for importing and exporting data between an external computing environment 11 operating on one or more computer platforms 12 and an object oriented computing environment 13 operating on one or more computer platforms 14. It will be understood by those having skill in the art that each of computer platforms 12 and 14 typically include computer hardware units 16 such as a central processing unit (CPU) 17, main memory 18 and an input/output (I/O) interface 19, and may include peripheral components such as a display terminal 21, an input device 22 such as a keyboard or a mouse, nonvolatile data storage devices 23 such as magnetic or optical disks, printers 24 and other peripheral devices. Computer platform 12 or 14 also typically includes microinstruction code 26, and an operating system 28.

As shown in FIG. 1, object oriented computing environment 13 operates on computer platform 14, and external computing environment 11 operates on computer platform 12. However, it will be understood by those having skill in the art that object oriented computing environment 13 and external computing environment 11 may each operate across multiple computer platforms. Alternatively, object oriented computing environment 13 and external computing environment 11 may operate on the same computer platform. Moreover, the external computing environment may operate on a computer platform which is part of a work station which also includes display terminal 21 and input device 22.

As one example, each computer platform 12 and 14 may be a computer having an IBM System 370 architecture. Operating system 28 may be an IBM multiple virtual storage (MVS) operating system. Object oriented computing environment 13 is preferably written in Intermediate C, which is an object oriented dialect of the C computer programming language and is similar to the C++ computer programming language. The design and operation of computer platforms and object oriented computing environments are well known to those having skill in the art and are described, for example in U.S. Pat. Nos. 5,161,225 to Abraham et al. entitled Persistent Stream for Processing Time Consuming and Reusable Queries in an Object Oriented Database Management System; 5,151,987 to Abraham et al. entitled Recovery Objects in an Object Oriented Computing Environment; and 5,161,223 to Abraham entitled Resumeable Batch Query for Processing Time Consuming Queries in an Object Oriented Database Management System, all assigned to the assignee of the present invention, the disclosures of which are hereby incorporated herein by reference, and in numerous textbooks such as Object Oriented Software Construction by Bertrand Meyer, published by Prentice Hall in 1988, the disclosure of which is hereby incorporated herein by reference.

Importing and Exporting System: Overall Design and Operation

Referring now to FIG. 2, a system for importing and exporting data according to the present invention is shown. As shown, the system is included within object oriented computing environment 13 (FIG. 1) and provides import and export of data between object oriented computing environment 13 and external computing environment 11. As also shown in FIG. 2, the importing and exporting system includes datalist generating means 31 for generating datalist objects 32 which list data field names in the external computing environment 11, a corresponding attribute in the object oriented computing environment 13 and a corresponding external data format for each external data field in the external computing environment 11. The detailed design and structure of datalist objects 32 will be described below.

Still referring to FIG. 2, the importing and exporting system also includes metadata generating means 33 for generating a metadata object 43 for each data object 36 in the object oriented computing environment 13 which includes one of the corresponding object oriented computing environment attributes from datalist 32. As will be described below, the metadata object 43 is an attribute of the external object class, and includes, as part of its attributes and methods, parameters and routines for converting the corresponding object oriented computing environment attribute into the corresponding external data format.

Still referring to FIG. 2, importing means 37 is responsive to a request from the external computing environment 11 to import external data into the object oriented computing environment. Importing means 37 identifies an object oriented computing environment attribute from the datalist objects 32 and identifies a corresponding metadata object 43. Importing means 37 also applies the conversion parameters in the corresponding metadata object 43 to the data provided by the external computing environment 11 to thereby convert the external data into object oriented data and place the object oriented data into the corresponding data object 36 which is associated with the corresponding metadata object 43.

Finally, still referring to FIG. 2, the importing and exporting system includes exporting means 38, which is responsive to a request from the object oriented computing environment 13 to export data from an object 36 to the external computing environment 11. Exporting means 38 identifies a metadata object 43 which corresponds to the object 36. Exporting means 38 also identifies the external data name corresponding to the metadata object 43 from the datalist 32. Finally, exporting means 38 applies conversion parameters in the corresponding metadata object 43 to the data from the object 36, to thereby convert the object oriented data into external data. The external data is then passed to the external computing environment 11 using known techniques.

Figure 3:
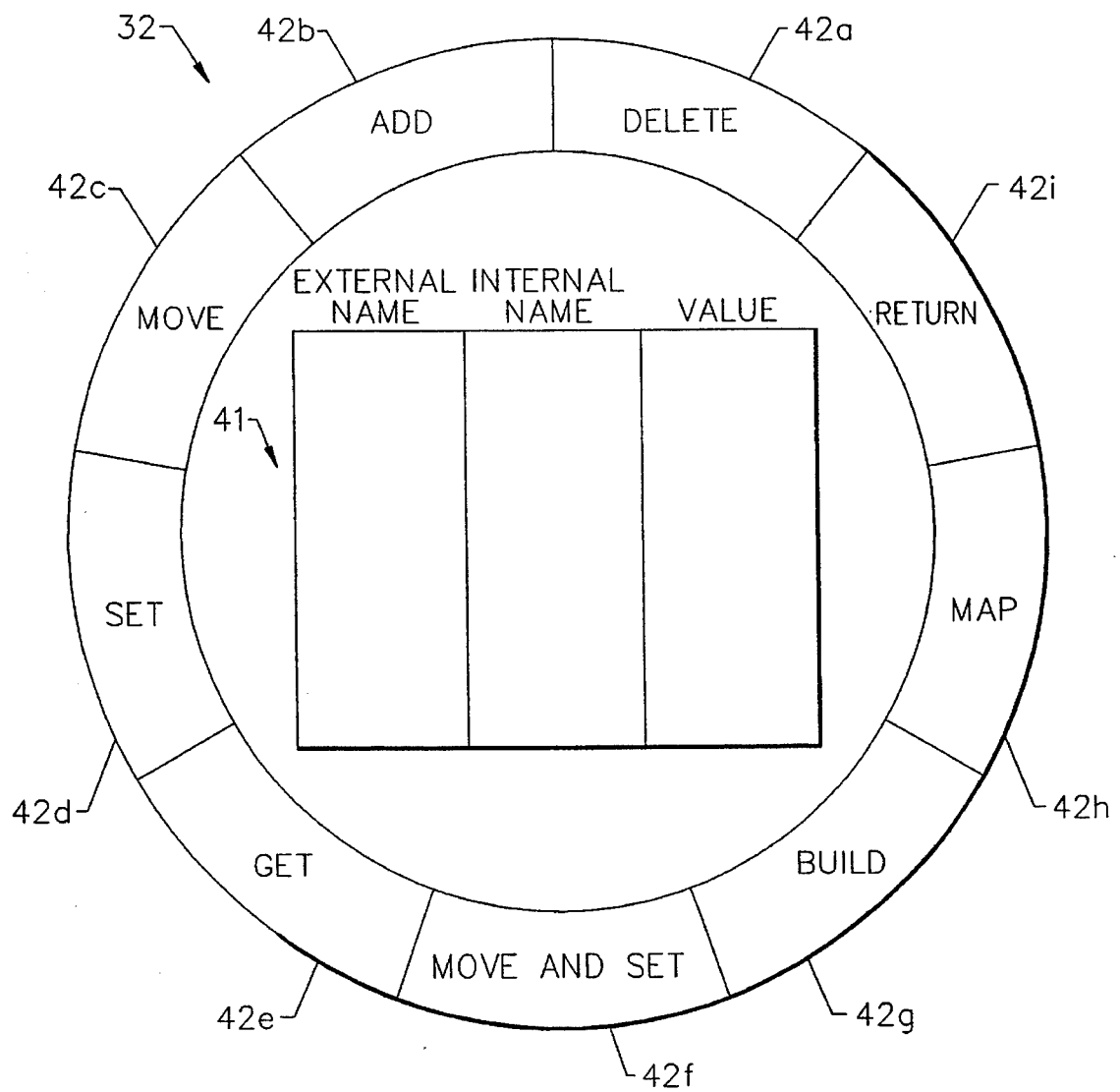
FIG. 3 illustrates a structure for the datalist class of FIG. 2.

Referring now to FIG. 3, the structure of the datalist object class 32 will be described. As shown, the datalist class frame 41 includes attributes which associate an external name, an internal name and a value. The external name is the name of a data field in external computing environment 11. The internal name is the name of the attribute of an associated data object 36. The value is the format of the data in the associated external name. The datalist includes datalist class methods 42a–42i for deleting, adding, moving, setting, getting, moving and setting, building, mapping, and returning respectively, as will be described in detail below.

Figures 4A, 4B:
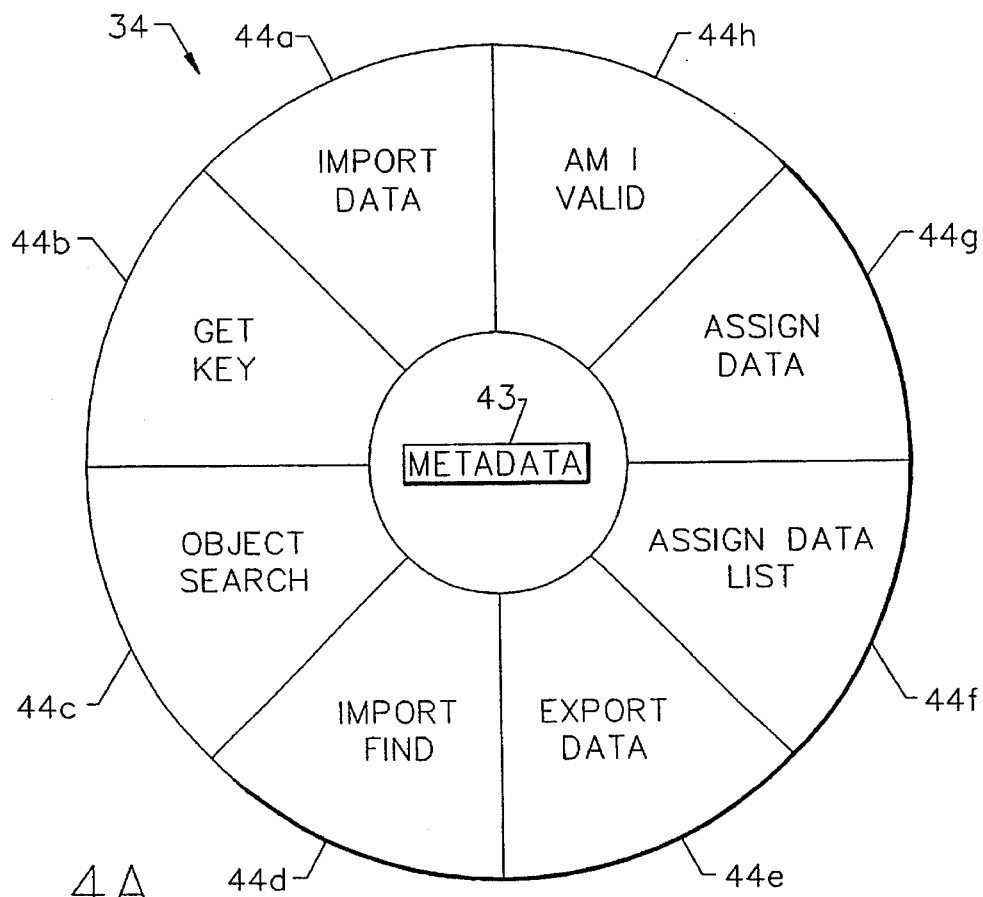
FIGS. 4A and 4B illustrate a structure for the external object class of FIG. 2.

Referring now to FIGS. 4A and 4B, the structure of external object class 34 is illustrated. As shown, external object class 34 includes a metadata frame 43 and a plurality of metadata methods 44a–44h as will be described in detail below. Metadata frame 43, which itself forms a metadata object, contains metadata attributes 46a–46n as will be described in detail below.

Figure 5:
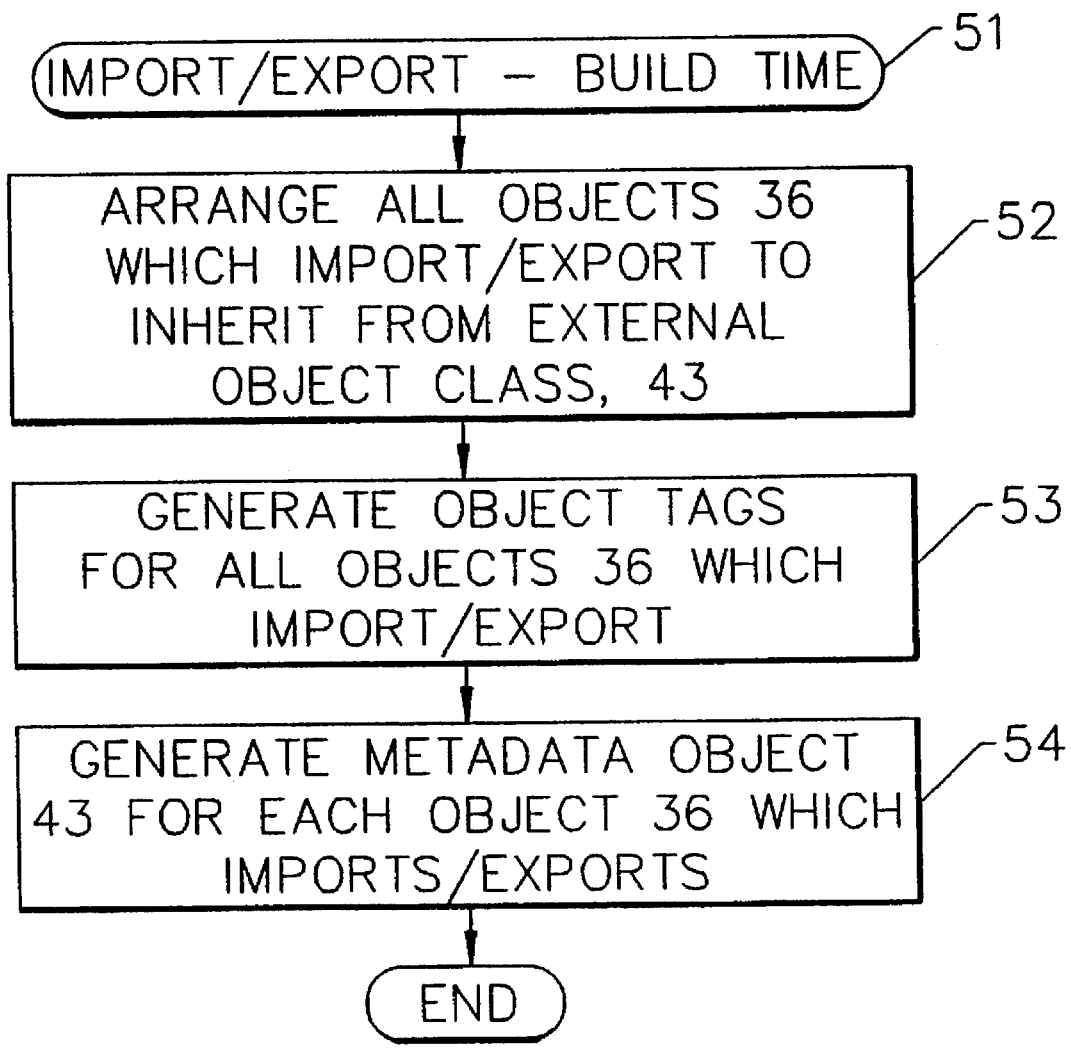
FIG. 5 illustrates operations performed by the importing means and exporting means of FIG. 2 at program generation time.

Referring now to FIG. 5, importing means 37 and exporting means 38 (FIG. 2) operate during generation of the object oriented computing environment, also referred to as "build time" (Block 51) as follows. As shown in Block 52, all objects 36 which are to import or export are arranged to inherit from the external object class 34 so that the methods 44 of the external object class and the metadata object 43 associated with the external object class applies to all these objects.

Then, at Block 53, object tags are added to all objects 36 which import/export, to be used in generating the metadata object, as described below. It will be understood that the operations of Block 54 are typically performed by a programmer operating on object oriented computing environment 13, although other systems can initiate these actions as well. Finally, as shown in Block 54, a metadata object 43 is generated for each object 36 which imports/exports. The metadata object defines the parameters for importing and exporting as will be described in detail below.

Figure 6:
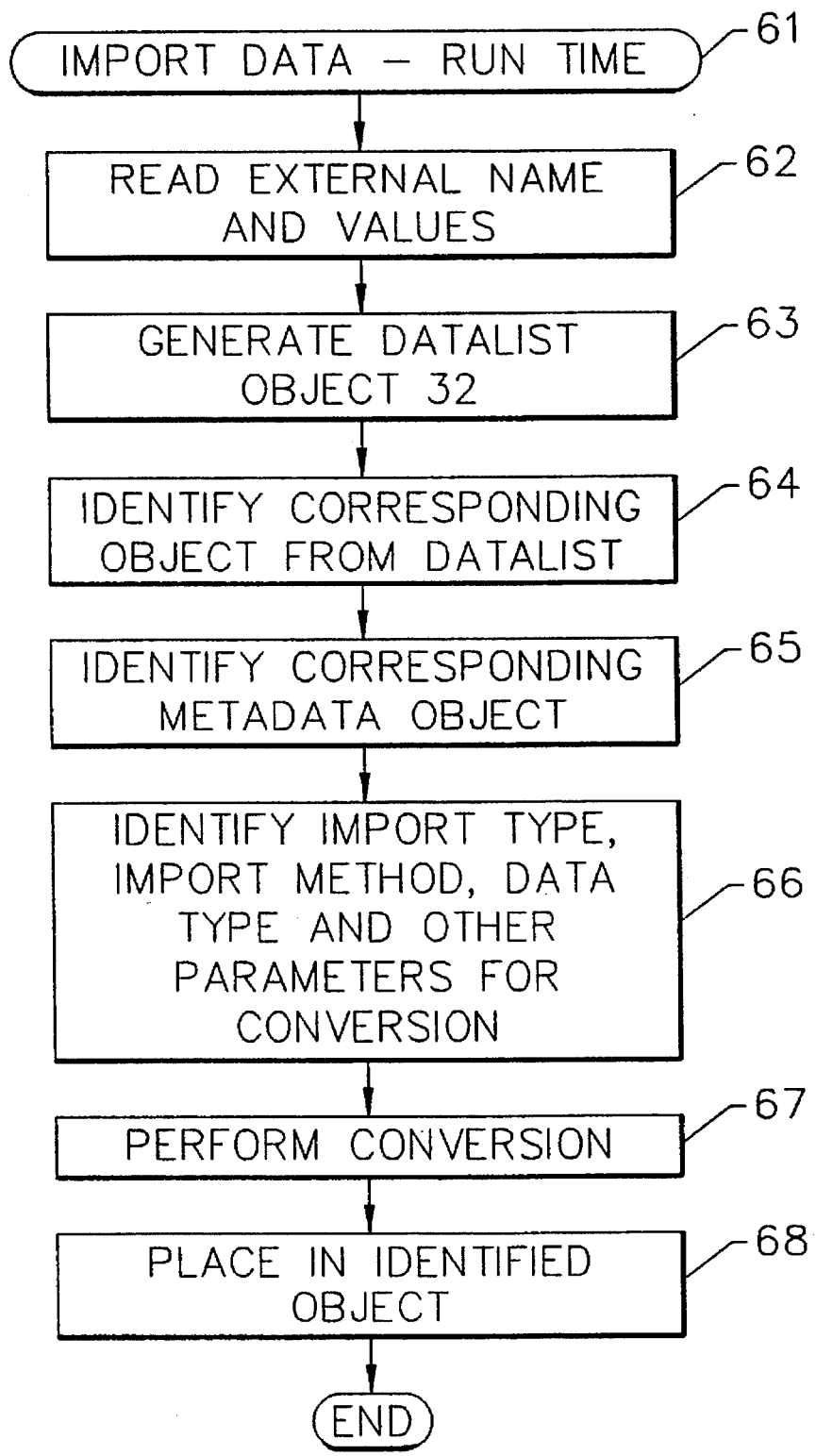
FIG. 6 illustrates operations performed by the importing means of FIG. 2 at program execution time.

Referring now to FIG. 6, the importing means 37 (FIG. 2) operates to import data in response to an external computing environment request during execution of the object oriented environment, also referred to as "run time", (Block 61) as follows. As shown in Block 62, the external name and values are read from the file, panel, window or other import mechanism provided by the external computing environment 11. The importing means then generates the datalist object 32 (Block 63). The importing means 37 then identifies the corresponding object using the appropriate datalist 32 (Block 64). At Block 65, the corresponding metadata object which is associated with the identified object, is identified. Then, at Block 66, using the identified metadata object, the import type, import method, data type and other parameters which are used for conversion are identified. At Block 67, based on the identified parameters, the conversion is performed. Finally, at Block 68 the converted data is placed in the identified object.

Figure 7:
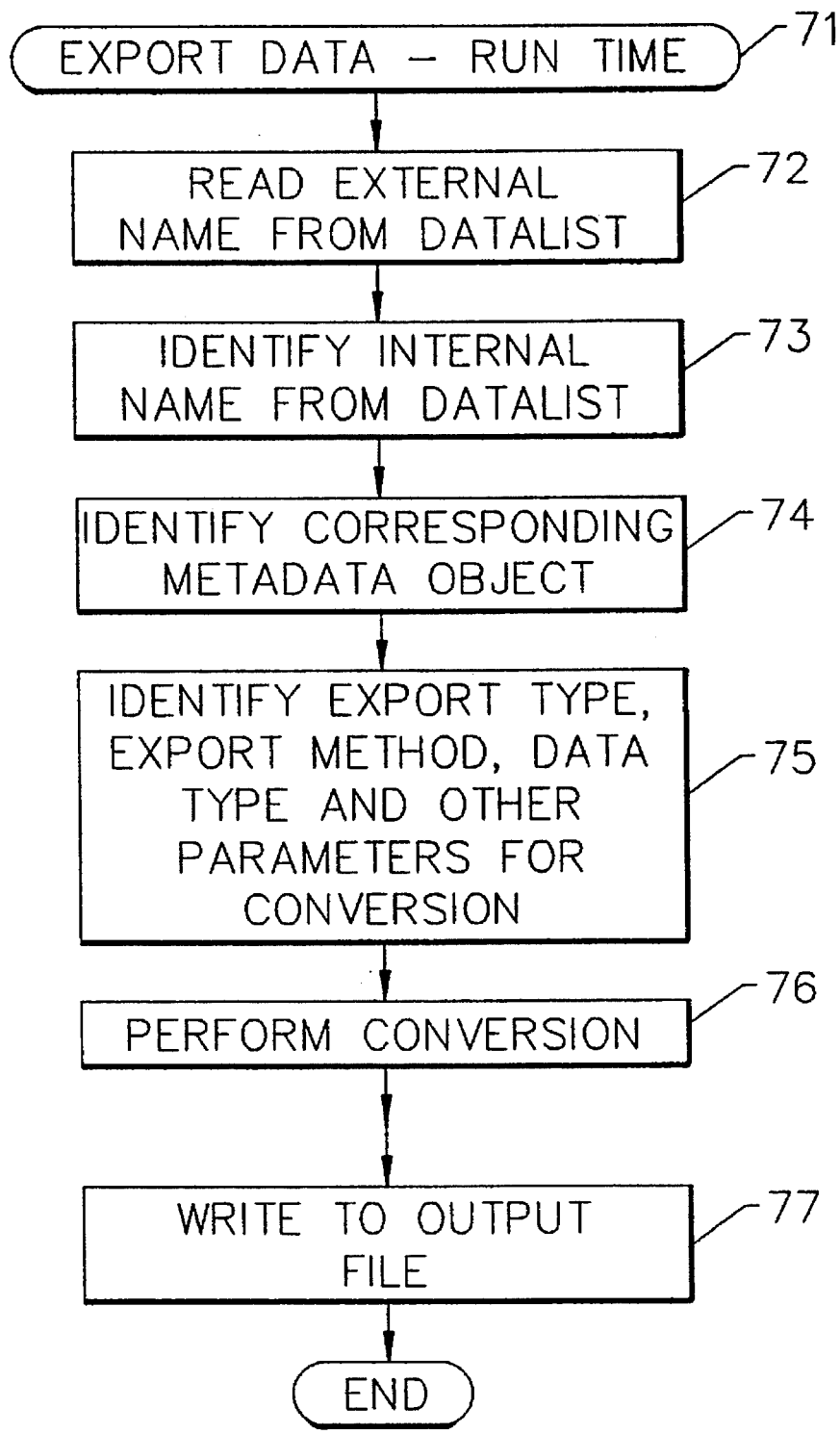
FIG. 7 illustrates operations performed by the exporting means of FIG. 2 at program execution time.

Referring now to FIG. 7, the exporting means 38 (FIG. 2) operates to export data in response to an object oriented computing environment request during execution of the object oriented environment, also referred to as "run-time" (Block 71) as follows. As shown in Block 72, an internal name is identified from the datalist and at Block 73 the internal name is identified from the datalist 32. A corresponding metadata object 43 is then identified at Block 74. From the metadata object, export type, export method, data type and other parameters for conversion are identified at Block 75. The conversion is then performed at Block 76 and the results of the conversion are written to an output file at Block 77. The output file is then processed in the same manner as any other output file by the computer platform 14.

Importing and Exporting System: Detailed Design and Operation

Having presented an overview of the design and operation of the importing and exporting system and method of the present invention, a detailed description of the design and operation of the system and method will now be provided. The datalist object class 32 (FIG. 3) will first be described, including detailed examples thereof. Additional tags which are added to object classes and attributes in order to implement the importing and exporting system and method will then be described. The external object class 34 including the metadata object 43 will then be described in detail. Following the detailed description, examples which illustrate operation of the present invention at build time and at run time will be provided.

DATA_LIST CLASS

Referring again to FIG. 3, the Data_List Class 32 is an object class which contains an array of:

Name: STRING(n);
Value: STRING(n);

Name contains the name for the instance attributes in the following syntax:

Name1.Name2.Name3 ... NameN where Name$i$ is the internal name for the current class.

For example, assume a Family object which contains two attributes Mom and Dad, which are of type Person. Assume also that the Person object has three attributes Soc_Sec_Num of type LONG (primitive), Phone_Number of type Phone, and Birth_Date of type Date. The Phone object has three primitive attributes Area_Code, Phone_Num, and Extension. The Date object has three primitive objects Date_Num, Calendar, and Format. FIG. 8A illustrates the Family Object. FIG. 8B illustrates a datalist frame 41 for the Family object. Values may contain wild card characters to support "fuzzy" data.

The methods 42 of the datalist object 32 are as follows:
Delete methods 42a:
 Delete an entry given an internal name
 Delete an entry given an external name
Add methods 42b:
 Add an entry with this internal name (if one does not already exist)
 Add an entry with this external name (if one does not already exist)
Move methods 42c:
 Move to the entry with this internal name
 Move to the entry with this external name
Set methods 42d:
 Set the current entry's external name
 Set the current entry's internal name
 Set the current entry's value
Get methods 42e:
 Get the current entry's external name
 Get the current entry's internal name
 Get the current entry's value
Move and set methods 42f:
 Move to the entry with this external name and set the internal name and value
 Move to the entry with this external name and set the internal name
 Move to the entry with this external name and set the value
 Move to the entry with this internal name and set the external name
 Move to the entry with this internal name and set the value
Build methods 42g:
 Build list of all external names
 Build list of all internal names
Map methods 42h:
 Map external names to internal names using this varclass
 Map internal names to external names using this varclass
Return methods 42i:
 Return union list
 Return intersection list
 Return list of non-equal values In a preferred embodiment of a datalist frame 41 illustrated in FIG. 9, the entries are stored in any arbitrary order, but index tables are maintained to access the entries by external name and by internal name. This allows binary searching of the entries by both external name and internal name.

Also, in a preferred embodiment, a variable frame area is used to build the datalist entries. In other words, the frame contains a variable area slot object which knows how to manipulate an array of arbitrary structures within the variable area. Slot objects are described in copending application Ser. No. 07/425,746 to Abraham et al. entitled Slot Objects for an Object Oriented Programming System, and assigned to the assignee of the present invention, the disclosure of which is hereby incorporated herein by reference.

A mechanism is also provided to map external names to/from internal names for each class which is to be imported/exported. This mechanism can be either a build-time mapping which is converted and maintained whenever a class is processed, or it may be a run-time mapping which converts between the two names as required.

TAGS

As is well known to those having skill in the object oriented computing art, a tag is a modifier of a fundamental attribute. According to the invention, Class Tags and Attribute Tags are added to objects and object classes which are to be imported/exported. Two Class Tags are added:
 DEFAULT_IMPORT
  This tag specifies the default import technique to be used when no ATTRIBUTE_IMPORT tag is declared for an attribute.
  See the ATTRIBUTE_IMPORT tag for further details.

DEFAULT_EXPORT
    This tag specifies the default export technique to be used when no ATTRIBUTE_EXPORT tag is declared for an attribute.
    See the ATTRIBUTE_EXPORT tag for further details.

Three Attribute Tags are also added. The attribute tags appear anywhere beginning on the line following the attribute and before the attribute's first comment line. One may redefine an inherited attribute and respecify these tags as desired. The respecifications will then be inherited by all children as well. These attribute tags are available for use with any attribute and are:

UNIQUE_KEY
    This tag identifies this attribute as one of the attributes which makes up this object's unique key; i.e. those attributes which uniquely identify the object.

ATTRIBUTE_IMPORT
    This tag specifies the manner in which the attribute is to be imported. It overrides the DEFAULT_IMPORT tag for this attribute only. If no ATTRIBUTE_IMPORT tag is specified, Import_Data_List defaults to the action specified by the DEFAULT_IMPORT tag. The ATTRIBUTE_IMPORT tag is described in detail below.

ATTRIBUTE_EXPORT
    This tag specifies the manner in which the attribute is to be exported. It overrides the DEFAULT_EXPORT tag for this attribute only. If no ATTRIBUTE_EXPORT tag is specified, Export_Data defaults to the action specified by the DEFAULT_EXPORT tag. The ATTRIBUTE_EXPORT tag is described in detail below.

ATTRIBUTE_IMPORT
The syntax of the ATTRIBUTE_IMPORT tag is as follows:

ATTRIBUTE_IMPORT "value";

where "value" is one of the following:
    IGNORE
        This attribute is not to be imported.
    ATTRIBUTE
        This attribute is to be imported. Assign_Data is to invoke the Import_Data method of the attribute's static class, using the attribute itself as the object of the message call. This implies that the attribute is capable of being used in this manner; that is, the attribute is either an object reference or a slot object. If the particular attribute being imported is type VIRTUAL, this value is invalid and will result in a syntax error. Otherwise, if the particular attribute being exported is not an object reference or a slot object or VIRTUAL, Assign_Data will convert the input form of the data into the data type of the attribute and store it directly into the frame. A virtual attribute is an attribute which has no storage allocated in the frame but which still has an entry in the Meta_Data object. It's syntax is:

attribute_name: VIRTUAL;

ATTRIBUTE alternate_method
        This attribute is to be imported.
        Assign_Data is to invoke the alternate_method of the attribute's static class, using the attribute itself as the object of the message call. This implies that the attribute is capable of being used in this manner; that is, the attribute is either an object reference or a slot object. If the particular attribute being imported is not an object reference or a slot object, this value is invalid and will result in a syntax error. The alternate_method must conform to the criteria previously established for the Import_Data method.
    set_attribute_method
        This attribute is to be imported. Assign_Data is to invoke the specified set_attribute_method, which is a method in this containing class, using SELF the object of the message call. This method should only perform field level validations. Other validations (e.g. cross-field and cross-object validations) should be placed in the Am_I_Valid method.
        The set_attribute_method conforms to the following call interface:
    set_attribute_method (value_in: in "primitive"; rc_in_out: in_out RETURN_CODE_CLASS);
        See the Assign_Data method in the External Class for a list of supported primitives.
        Due to C's ability to support variable parameter lists, the above calling format will work with methods also defined as:
        set_attribute_method (value_in: in "primitive");

ATTRIBUTE EXPORT
The syntax of the ATTRIBUTE_EXPORT tag is as follows:

ATTRIBUTE_EXPORT: "value";

where "value" is one of the following:
    EXCLUDE
        This attribute is not to be exported.
    ATTRIBUTE
        This attribute is to be exported. If the attribute is an object reference or a slot object, Export_Data will invoke the Export_Data method of the attribute using the attribute itself as the object of the message call. If the particular attribute being imported is type VIRTUAL, this value is invalid and will result in a syntax error. If the particular attribute being exported is not an object reference or a slot object or VIRTUAL, that is, it is a primitive, then Export_Data will take the attribute data directly from the frame and convert it from the data type of the attribute into a string.
    ATTRIBUTE KEYS_ONLY
        This attribute is to be exported. Export_Data is to invoke the Get_Key method of the attribute using the attribute itself as the object of the message call. This implies that the attribute is capable of being used in this manner; that is, the attribute is either an object reference or a slot object. If the particular attribute being exported is not an object reference or a slot object, this value is invalid and will result in a syntax error.
    ATTRIBUTE alternate_method
        This attribute is to be exported. Export_Data is to invoke the Export_Data method of the attribute using the attribute itself as the object of the message call. This implies that the attribute is capable of being used in this manner; that is, the attribute is either an object reference or a slot object. If the particular attribute being exported is not an object reference or a slot object, this value is invalid and will result in a syntax error. The alternate_method must conform to the criteria previously established for the Export_Data method. It is the responsibility of the alternate_method to decide which attributes are added to the data_list.

get_attribute_method
This attribute is to be exported. Export_Data is to invoke the specified get_attribute_method, which is a method in this containing class, using SELF as the object of the message call.

The get_attribute_method conforms to the following call interface:

get_attribute_method (value _out: out "primitive"; rc_in_out: in_out RETURN_CODE_CLASS);

See the Assign_Data method in the external class for a list of supported primitives.

Due to C's ability to support variable parameter lists, the above calling format will work with methods also defined as:

get_attribute_method (value _out: out "primitive");

Since most attribute access methods are already in one of these two supported formats, this should minimize impacts to existing code.

EXTERNAL OBJECT CLASS

The External Object class 34 (FIGS. 4A and 4B) is an abstract parent object class which provides the interfaces for data interaction between the internal object oriented computing environment 13 and the external world computer environment 11. The External Class will have the following features:

Meta_Data Frame, 43
This class frame encapsulates information about features of the class. The Meta_Data object is created and populated during build time.

Import_Data Method, 44a
This class method accepts a Data_List of one or more entries and:
1. invokes the Import_Find method, and then
2. invokes the Assign_Data_List method using the instance returned by the Import_Find method.

Get_Key Method, 44b
This instance method returns a Data_List containing the Name and Value for all of its UNIQUE_KEY fields.

Object_Search Method, 44c
This class method accepts a Data_List and returns a reference to an instance of the in memory object which matches the key values found in the Data_List.

Import_Find Method, 44d
This class method accepts a Data_List and returns a reference to an instance of the object which matches the key values found in the Data_List.

Export_Data Method, 44e
This instance method returns a Data_List for the instance.

Assign_Data_List Method, 44f
This instance method accepts a Data_List and processes each entry in the list.

Assign_Data Method, 44g
This instance method accepts a Data_List Name and Value and assigns the value depending on the class' Meta_Data.

Am_I_Valid Method, 44h
This instance method checks the instance to ensure it is in a valid state. For example, this method performs cross-field and cross-object validations.

META_DATA OBJECT, 43

This object encapsulates information about features of the class. The Meta_Data object is created and populated during build time. It contains the following information about each attribute in the containing class:

Internal Attribute Name, 46a
This is the name of the attribute.

Internal Data Type, 46b
This is the data type (i.e. static class) of the attribute.

Class/Instance Indicator, 46c
This indicates whether the attribute is a class attribute or an instance attribute.

Internal Location, 46d
This is the location of the attribute within the enclosing instance frame or class data area.

Import Type, 46e
This is how Assign_Data is to assign the attribute as defined by the ATTRIBUTE_IMPORT tag. Valid values are:

IGNORE

ATTRIBUTE

OVERRIDE

Import Alternate Method, 46f
This is the method which is to be invoked instead of the default Import_Data method when ATTRIBUTE_IMPORT: ATTRIBUTE alternate_method; is specified.

Set Attribute Method, 46g
This is the method which is to be invoked to assign the attribute being imported when ATTRIBUTE_IMPORT: set_attribute_method; is specified.

Set Attribute Method Data Type, 46h
This is the data type of the value to be passed as the first parameter of the set_attribute_method. It is obtained by looking at the data type as coded for the first parameter of the set_attribute_method.

Import Optimization Information, 46i
Information is stored here to facilitate the optimization of messages during import.

Export Type, 46j
This is how Export_Data is to export the attribute as defined by the ATTRIBUTE_EXPORT tag or DEFAULT_EXPORT tag, as appropriate. Valid values are:

EXCLUDE

ATTRIBUTE

UNIQUE_KEY

ATTRIBUTE_ALL

OVERRIDE

Export Alternate Method, 46k
  This is the method which is to be invoked instead of the Export_Data method when ATTRIBUTE_EXPORT: ATTRIBUTE alternate_method; is specified.
Get Attribute Method, 46l
  This is the method which is to be invoked to retrieve the value of the attribute being exported when ATTRIBUTE_EXPORT: get_attribute_method; is specified.
Get Attribute Method Data Type, 46m
  This is the data type of the value to be passed as the first parameter to the get_attribute_method. It is obtained by looking at the data type as coded for the first parameter of the get_attribute_method.
Export Optimization Information, 46n
  Information is stored here to facilitate the optimization of messages during export.

IMPORT_DATA METHOD, 44a

This class method accepts a Data_List and:
1. invokes the Import_Find method, and then
2. invokes the Assign_Data_List method using the instance returned by the Import_Find method.

The interface to the Import_Data method is as follows:

```
import_data (
    data_list_in_out    : in out DATA_LIST_CLASS;
    rc_in_out           : in out  RETURN_CODE_CLASS );
```

GET__KEY METHOD, 44b

This instance method returns a Data_List containing the Name and Value for all of its UNIQUE_KEY fields. The interface to the Get_Key method is as follows:

```
get_key (
    data_list_out    : out DATA_LIST_CLASS;
    rc_in_out        : in out RETURN_CODE_CLASS );
```

OBJECT_SEARCH METHOD, 44c

This class method accepts a Data_List and returns a reference to an instance of the in-memory object which matches the key values found in the Data_List. The interface to the Object_Search method is as follows:

```
object_search (
    data_list_in    : in DATA_LIST_CLASS;
    rc_in_out       : in out RETURN_CODE_CLASS )
return OREF;
```

This method's behavior is as follows:
1. Search for object in this Unit of Work (UOW) instance, starting at the current UOW level down to UOW level 0, by invoking the Get_Key method of each object in this UOW instance which is of this class and comparing it to data_list_in. If a match is found, return the object's OREF. Units of Work are described in application Ser. No. 07/425,607 to Abraham et al., filed Oct. 23, 1989, entitled Unit of Work for Preserving Data Integrity of a Database, assigned to the assignee of the present invention, the disclosure of which is hereby incorporated herein by reference.
2. Search for the object in the Global UOW instance, by invoking the Get_Key method of each object in the Global UOW instance which is of this class and comparing it to data_list_in. If it is found, return the object's OREF.
3. If no match is found, return VOID_OREF;

It is expected that children may want to redefine this method to add a database search if the object is not found in memory.

IMPORT_FIND METHOD, 44d

This class method accepts a Data_List and returns a reference to an instance of the object which matches the key values found in the Data_List. The interface to the Import_Find method is as follows:

```
import_find (
    data_list_in_out    : in out DATA_LIST_CLASS;
    rc_in_out           : in out RETURN_CODE_CLASS )
return OREF;
```

The default behavior assumes that if the instance is not in the database, a new one is to be created. To support this assumption, a class attribute, Import_Obj, will be utilized to optimize creation of the new instances. The effective logic flow is:
1. Invoke Object_Find and return any non-void OREFs.
2. Otherwise, if Import_Obj.VOID=TRUE then SELF.unflat(Import_Obj'address).
3. Set rc_in_out to OK.
4. return Import_Obj.copy.

EXPORT_DATA METHOD, 44e

This instance method returns a Data_List for the instance. If the Data_List already has internal names, then only the values for those names already in the Data_List will be filled in. If the Data_List is empty, then an entry containing the Name and Value will be added to the Data_List for all exportable attributes. The interface to the Export_Data method is as follows:

```
export_data (
    data_list_in_out    : in out DATA_LIST_CLASS;
    rc_in_out           : in out RETURN_CODE_CLASS );
```

ASSIGN_DATA_LIST METHOD, 44f

This instance method accepts a Data_List, and:
1. "Removes" IGNORE entries (i.e. copy non-IGNORE entries to a new filtered Data_List).
2. Invokes SELF.Export_Data to get a Data_List for the instance.
3. Compares this Data_List with the filtered Data_List and removes those entries with matching Names and Values from the filtered Data_List.
NOTE: This will not eliminate every unnecessary assignment. However, it should eliminate most of them. It is possible that:
  a. The imported value is not exported.
  b. The imported value is actually in a form different from the exported value (e.g. personnel ID in but full person name out).

4. Invokes Assign_Data_List for each internal name sub-set in the filtered Data_List, or invokes Assign_Data for each single internal name in the filtered Data_List.
5. Invokes the Am_I_Valid method to ensure that the state migration caused by processing the Data_List was valid.

The interface to the Assign_Data_List method is as follows:

```
assign_data_list (
    data_list_in_out    : in out DATA_LIST_CLASS;
    rc_in_out           : in out RETURN_CODE_CLASS );
```

ASSIGN_DATA METHOD, 44g

This instance method accepts a Data_List and, depending on the class' Meta_Data, it either:
- converts the data to a primitive and stuffs it right into the instance,
- continues processing with the Meta_Data of the attribute's static class using the next "name." tag,
- cascades processing to the contained object's Assign_Data_List method to let it determine how to assign the attribute, or
- converts the data to a primitive and invokes the appropriate instance set_attribute_method.

The interface to the Assign_Data method is as follows:

```
assign_data (
    data_list_in_out    : in out DATA_LIST_CLASS;
    rc_in_out           : in out RETURN_CODE_CLASS );
```

Supported primitives are:
  BOOLEAN
  CHAR
  DB2_VARCHAR
  DOUBLE
  LONG
  REAL
  SHORT
  STRING
  NLS_DOUBLE
  NLS_LONG
  NLS_REAL
  NLS_SHORT
  NLS_STRING Build Time Examples In order to illustrate operation of the import data means and export data means during program generation (build time), as described generally in FIG. 5, five build time examples will now be provided. In the following Tables, Set Attribute Method Data Type has been abbreviated as Set Method Data Type, and Get Attribute Method Data Type has been abbreviated as Get Method Data Type. For these examples, assume the following is coded in the class prolog:
  package body MY_CLASS is
    DEFAULT_IMPORT: ATTRIBUTE;

EXAMPLE 1 attr_1: LONG;
—* This attribute needs no special
—* processing
—* on either import or export. The default
—* import and export characteristics are
—* applied.

The Meta_Data for this sample attribute is illustrated in Table 1.

TABLE 1

| Meta_Data Example 1 | | | | | | |
|---|---|---|---|---|---|---|
| Internal Name | Internal Data Type | Internal Location | Import Type | Import Alternate Method | Set Method | Set Method Data Type |
| attr_1 | LONG | 0xF123 | | | | |

| Import Optimization Information | Export Type | Export Alternate Method | Get Method | Get Method Data Type | Export Optimization Information |
|---|---|---|---|---|---|
| | | | | | |

EXAMPLE 2 attr_2: LONG;
—ATTRIBUTE_IMPORT: imp_attr_2;
—ATTRIBUTE_EXPORT: exp_attr_2;
—* This attribute needs special processing
—* on
—* import and the method is the imp_attr_2
—* method within this class.
—*
—* This attribute needs special processing
—* on
—* export and the method is the exp_attr_2
—* method within this class.
where the imp_attr_2 method is defined as:
  imp_attr_2 (value_in: in LONG);
and exp_attr_2 is defined as:

exp_attr_2 (value_out: out LONG);
The Meta_Data for this sample attribute is as illustrated in Table 2.

TABLE 2

| Meta_Data Example 2 | | | | | | |
|---|---|---|---|---|---|---|
| Internal Name | Internal Data Type | Internal Location | Import Type | Import Alternate Method | Set Method | Set Method Data Type |
| attr_2 | LONG | 0xF456 | | | | |

| Import Optimization Information | Export Type | Export Alternate Method | Get Method | Get Method Data Type | Export Optimization Information |
|---|---|---|---|---|---|
| | | | | | |

EXAMPLE 3 attr_3: MY_SLOT;
—ATTRIBUTE_IMPORT: put_name;
—ATTRIBUTE_EXPORT: get_name;
—* This attribute needs special processing
—* on
—* import and the method is the put_name
—* method within this class.
—*
—* This attribute needs special processing
—* on
—* export and the method is the get_name
—* method within this class.
where put_name is defined as:
  put_name (value_in: in DB2_VARCHAR; rc_in_out: in_out RETURN_CODE_CLASS);
and get_name is defined as:
  get_name (value_out: out DB2_VARCHAR; rc_in_ out: in_out RETURN_CODE_CLASS);
The Meta_Data for this Example is illustrated in Table 3.

EXAMPLE 4 attr_4: MY_FRAME;
—* Use the DEFAULT_IMPORT setting.
—* This attribute needs special processing
—* on
—* import and the method is found in the
—* MY_FRAME class.
—*
—* Use the DEFAULT_EXPORT setting.
—* This attribute needs special processing
—* on
—* export and the method is found in the
—* MY_FRAME class.
where MY_FRAME specifies CLASS_IMPORT: find;, and the find method is a class method defined as:
  find (value_in: in STRING; rc_in_out: in_out RETURN_CODE_CLASS) returns MY_FRAME;
and MY_FRAME specifies CLASS_EXPORT: unfind;, and the unfind method is an instance method defined as:
  unfind (value_out: out STRING; rc_in_out: in_out RETURN_CODE_CLASS);
The Meta_Data for this sample attribute is illustrated in Table 4.

TABLE 3

| Meta_Data Example 3 | | | | | | |
|---|---|---|---|---|---|---|
| Internal Name | Internal Data Type | Internal Location | Import Type | Import Alternate Method | Set Method | Set Method Data Type |
| attr_3 | MY_SLOT | 0xF789 | | | | |

| Import Optimization Information | Export Type | Export Alternate Method | Get Method | Get Method Data Type | Export Optimization Information |
|---|---|---|---|---|---|
| | | | | | |

TABLE 4

| Meta_Data Example 4 | | | | | | |
|---|---|---|---|---|---|---|
| Internal Name | Internal Data Type | Internal Location | Import Type | Import Alternate Method | Set Method | Set Method Data Type |
| attr_4 | MY_FRAME | 0xA123 | | | | |

| Import Optimization Information | Export Type | Export Alternate Method | Get Method | Get Method Data Type | Export Optimization Information |
|---|---|---|---|---|---|
| | | | | | |

EXAMPLE 5 attr_5: MY_SLOT;
—* Use the DEFAULT_IMPORT setting.
—* This attribute needs special processing
—* on
—* import and the method is found in the
—* MY_SLOT class.
—*
—* Use the DEFAULT_EXPORT setting.
—* This attribute needs special processing
—* on
—* export and the method is found in the
—* MY_SLOT class.

where MY_SLOT specifies CLASS_IMPORT: assign_str;, and assign_str is a class method defined as:

```
assign_str (
value_in           : in STRING;
rc_in_out          : in out RETURN_CODE_CLASS;
field_name_in      : in STRING );
``` and MY_SLOT specifies CLASS_EXPORT: get_str;, and get_str is an instance method defined as:

get_str (value_in_out: in_out STRING);

The Meta_Data for this sample attribute is illustrated in Table 5.

Run Time Examples

In order to illustrate the import and export of data during program execution (run time), as generally described in FIGS. 6 and 7, examples of operation of the importing means and exporting means at run time will be described. The pseudo code samples which follow are fragments of a pseudo code file and contain two separate areas, the data dictionary and the object data for that object. The two areas will be separated by two blank lines.

IMPORT

During import, final object validation may need to be done in a post unflat method. Import methods will typically validate only the actual value of the data being assigned in terms of the attribute to be assigned. There are situations, however, when all the individual fields may be valid separately, but the object itself may be in an invalid state. In these cases, the object's "Am_I_Valid" method is invoked from the Post_Unflat method. Also, if importing means 37 reads in an attribute who's external name it cannot find in the Meta_Data, it will invoke the DEFAULT_IMPORT method, passing that attribute and it's value.

The Examples which follow correspond to the five "Build Time Examples" of the previous section:

EXAMPLE 1

Assume Importing means 37 finds the following in a Importing means 37 file:

TABLE 5

| Meta_Data Example 5 | | | | | | |
|---|---|---|---|---|---|---|
| Internal Name | Internal Data Type | Internal Location | Import Type | Import Alternate Method | Set Method | Set Method Data Type |
| attr_5 | MY_SLOT | | | | | |

| Import Optimization Information | Export Type | Export Alternate Method | Get Method | Get Method Data Type | Export Optimization Information |
|---|---|---|---|---|---|
| | | | | | |

DEFID,4,EKNMYCLS; attr_1,LONG; . . . .

4;<1>:123; . . . .

The following processing takes place:
1. Importing means 37 reads in the attribute's internal name "attr_1" and the attribute's external value, say "123" from the datalist.
2. Importing means 37 looks in the Meta_Data of the class being imported for internal name "attr_1" and finds it.
3. Importing means 37 then looks at the attribute's import type and finds ATTRIBUTE.
4. Importing means 37 then looks at the attribute's internal data type and finds LONG.
5. Importing means 37 converts "123" into (LONG)123.
6. Importing means 37 looks at the attribute's internal offset and finds 0xF123.
7. Importing means 37 plugs (LONG)123 into the frame at offset 0xF123.

EXAMPLE 2

Assume Importing means 37 finds the following in a file:

DEFID,4,EKNMYCLS; attr_2, LONG; . . . .

4;<2>:123; . . . .

The following processing takes place:
1. Importing means 37 reads in the attribute's internal name "attr_2" and the attribute's external value, say "456".
2. Importing means 37 looks in the Meta_Data of the class being imported for internal name "attr_2" and finds it.
3. Importing means 37 then looks at the attribute's import type and finds SELF.
4. Importing means 37 then looks at the attribute's import method and finds imp_attr_2.
5. Importing means 37 then looks at the import method's data type and finds LONG.
6. Importing means 37 converts "123" into (LONG)123 .
7. Importing means 37 initializes a local RC to a no-error, no-messages state.
8. Importing means 37 invokes imp_attr_2 on the object being imported, passing (LONG)123 as the first parameter.
9. Importing means 37 evaluates the RC parameter for error conditions.

EXAMPLE 3

Assume Importing means 37 finds the following in a file:

attr_3,4,EKNMYCLS; Company Name,MY_SLOT; . . .

4;<2>:'Acme Business Machines'; . . .

The following processing takes place:
1. Importing means 37 reads in the attribute's internal name "attr_3" and the attribute's external value, say "Acme Business Machines".
2. Importing means 37 looks in the Meta_Data of the class being imported for internal name "attr_3" and finds it.
3. Importing means 37 then looks at the attribute's import type and finds SELF.
4. Importing means 37 then looks at the attribute's import method and finds put_name.
5. Importing means 37 then looks at the import method's data type and finds VARCHAR.
6. Importing means 37 converts "Acme Business Machines" into a varchar.
7. Importing means 37 initializes a local RC to a no-error, no-messages state.
8. Importing means 37 invokes put_name on the object being imported, passing the varchar as the first parameter.
9. Importing means 37 evaluates the RC parameter for error conditions.

EXAMPLE 4

Assume Importing means 37 finds the following in a file:

DEFID,4,EKNMYCLS; attr_4,MY_FRAME; . . .

4;<2>:'Acme Business Machines'; . . .

This example assumes use of external name which may not be correct. In any event, change MY_FRAME to the name that is selected.
The following processing takes place:
1. Importing means 37 reads in the attribute's internal name "attr_4" and the attribute's external value, say "Acme Business Machines".
2. Importing means 37 looks in the Meta_Data of the class being imported for internal name "attr_4" and finds it.
3. Importing means 37 then looks at the attribute's import type and finds ATTRIBUTE.
4. Importing means 37 then looks at the attribute's data type and finds MY_FRAME.
5. Importing means 37 then looks at the meta-class object for MY_FRAME for the import key method and finds find.
6. Importing means 37 then looks at the meta-class object for MY_FRAME for the import key method's data type and finds STRING.
7. Importing means 37 initializes a local RC to a no-error, no-messages state.
8. Importing means 37 sends the message attr_4.find passing the string as the first parameter.
9. Importing means 37 evaluates the RC parameter for error conditions.

EXAMPLE 5

Assume Importing means 37 finds the following in a file:

DEFID,4,EKNMYCLS; attr_5 string,MY_SLOT,6; . . .

DEFID,6,EKNMYSLT;attr_5 string,STRING; . . .

4;<2>:'Acme Business Machines'; . . .

The following processing takes place:
1. Importing means 37 reads in the attribute's internal name "attr_5" and the attribute's external value, say "Acme Business Machines".

2. Importing means 37 looks in the Meta_Data of the class being imported for internal name "attr_5" and finds it.
3. Importing means 37 then looks at the attribute's import type and finds ATTRIBUTE.
4. Importing means 37 then looks at the attribute's data type and finds MY_SLOT.
5. Importing means 37 then looks at the meta-class object for MY_SLOT for the import key method and finds assign_str.
6. Importing means 37 then looks at the meta-class object for MY_SLOT for the import key method's data type and finds STRING.
7. Importing means 37 initializes a local RC to a no-error, no-messages state.
8. Importing means 37 sends the message attr_5.assign_str passing the string as the first parameter.
9. Importing means 37 evaluates the RC parameter for error conditions.

EXPORT

Each of the Import Examples will now be described in the Export mode, as practiced by Exporting Means 38.

EXAMPLE 1

This example describes the steps involved in exporting attr_1.
1. Exporting means 38 looks in the Meta_Data of the class being exported and finds internal name attr_1.
2. Exporting means 38 then looks for the external name and finds "attr_1".
3. Exporting means 38 writes the external name to the output file.
4. Exporting means 38 looks for the attribute's export type and finds ATTRIBUTE.
5. Exporting means 38 then looks for the attribute's internal data type and finds LONG.
6. Exporting means 38 looks for the attribute's offset within the enclosing frame and finds 0xF123.
7. Exporting means 38 converts the LONG at offset 0xF123 into a string and writes it to the output file.

The output will be as follows:

DEFID,4,EKNMYCLS; attr_1,LONG; . . . .

4;<1>:123; . . . .

EXAMPLE 2

This example examines the steps involved in exporting attr_2.
1. Exporting means 38 looks in the Meta_Data of the class being exported and finds internal name attr_2.
2. Exporting means 38 then looks for the external name and finds "Long Value".
3. Exporting means 38 writes the external name to the output file.
4. Exporting means 38 looks for the attribute's export type and finds SELF.
5. Exporting means 38 then looks for the export method and finds exp_attr_2.
6. Exporting means 38 looks for the export method data type and finds LONG.
7. Exporting means 38 initializes a local RC to a no-error, no-messages state.
8. Exporting means 38 invokes exp_attr_2 of the instance being exported, passing the address of a LONG as the first parameter.
9. Exporting means 38 evaluates the RC parameter for error conditions.
10. Exporting means 38 converts the LONG into a string and writes it to the output file.

The output will be as follows:

DEFID,4,EKNMYCLS; attr_2,LONG; . . . .

4;<2>:123; . . . .

EXAMPLE 3

This example examines the steps involved in exporting attr_3.
1. Exporting means 38 looks in the Meta_Data of the class being exported and finds internal name attr_3.
2. Exporting means 38 then looks for the external name and finds "Company Name".
3. Exporting means 38 writes the external name to the output file.
4. Exporting means 38 looks for the attribute's export type and finds SELF.
5. Exporting means 38 then looks for the export method and finds get_name.
6. Exporting means 38 looks for the export method data type and finds VARCHAR.
7. Exporting means 38 initializes a local RC to a no-error, no-messages state.
8. Exporting means 38 invokes get_name of the instance being exported, passing the address of a VARCHAR as the first parameter.
9. Exporting means 38 evaluates the RC parameter for error conditions.
10. Exporting means 38 converts the VARCHAR into a string and writes it to the output file.

The output will be as follows:

DEFID,4,EKNMYCLS; Company Name,STRING; . . . .

4;<2>:'Acme Business Machines'; . . .

EXAMPLE 4

This example examines the steps involved in exporting attr_4.
1. Exporting means 38 looks in the Meta_Data of the class being exported and finds internal name attr_4.
2. Exporting means 38 then looks for the external name and finds "attr_4".
3. Exporting means 38 writes the external name to the output file.
4. Exporting means 38 looks for the attribute's export type and finds ATTRIBUTE.
5. Exporting means 38 then looks at the attribute's data type and finds MY_FRAME.

6. Exporting means 38 then looks at the meta-class object for MY_FRAME for the export key method and finds unfind.
7. Exporting means 38 then looks at the meta-class object for MY_FRAME for the export key method's data type and finds STRING.
8. Exporting means 38 initializes a local RC to a no-error, no-messages state.
9. Exporting means 38 sends the message attr_4.unfind passing the string as the first parameter.
10. Exporting means 38 evaluates the RC parameter for error conditions.
11. Exporting means 38 writes the resultant string(s) to the output file.

The output will be as follows:

DEFID,4,EKNMYCLS; attr_4,MY_FRAME; . . .

4;<2>:'Acme Business Machines'; . . .

This sample assumes use of external name which may not be correct. In any event, change MY_FRAME to whatever name we decide.

EXAMPLE 5

This example examines the steps involved in exporting attr_5.

1. Exporting means 38 looks in the Meta_Data of the class being exported and finds internal name attr_5.
2. Exporting means 38 then looks for the external name and finds "NLS String".
3. Exporting means 38 writes the external name to the output file.
4. Exporting means 38 looks for the attribute's export type and finds ATTRIBUTE.
5. Exporting means 38 then looks at the attribute's data type and finds MY_SLOT.
6. Exporting means 38 then looks at the meta-class object for MY_SLOT for the export key method and finds get str.
7. Exporting means 38 then looks at the meta-class object for MY_SLOT for the export key method's data type and finds STRING.
8. Exporting means 38 initializes a local RC to a no-error, no-messages state.
9. Exporting means 38 sends the message attr_5.get_str passing the string as the first parameter.
10. Exporting means 38 evaluates the RC parameter for error conditions.
11. Exporting means 38 writes the resultant string(s) to the output file.

The output will be as follows:

DEFID,4,EKNMYCLS; NLS String,SLOT,6; . . .

DEFID,6,EKNMYSLT;NLS string, STRING; . . .

4;<2>:'Acme Business Machines'; . . .

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for importing and exporting data between an external computing environment operating on one or more computer platforms and an object oriented computing environment operating on one or more computing platforms, said data importing and exporting system comprising:

datalist generating means for generating datalist objects which list an external computing environment data field name, a corresponding object oriented computing environment attribute and a corresponding external data format for each external data field in the external computing environment which is imported and exported between external computing environment and the object oriented computing environment;

metadata generating means for generating a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters;

importing means, responsive to a request from said external computing environment to import external data into said object oriented computing environment, for identifying an object oriented computing environment attribute from said datalist objects and for identifying a corresponding metadata object, and for applying the alternate conversion parameters in said corresponding metadata object to said external data if included in said corresponding metadata object, and for applying the default conversion parameters in said corresponding metadata object to said external data in the absence of said alternate conversion parameters in said metadata object, to thereby convert said external data into object oriented data and place said object oriented data into a corresponding data object which is associated with said corresponding metadata object; and exporting means, responsive to a request from said object oriented computing environment to export object oriented data from an object in said object oriented computing environment to said external computing environment, for identifying a metadata object corresponding to said object and for identifying said external data name corresponding to said metadata object from said datalist, and for applying the alternate conversion parameters in the corresponding metadata object to said object oriented data from said object if included in said corresponding metadata object, and for applying the default conversion parameters in the corresponding metadata object to said object oriented data from said object in the absence of said alternate conversion parameters in said metadata object, to thereby convert object oriented data into external data.

2. The system of claim 1 further comprising:

an external object class including external object class methods for importing data, exporting data, and finding objects; and means for causing each said object in said object oriented computing environment which includes one of said corresponding object oriented computing environment attributes, to inherit from said external object class, to thereby inherit said external object class methods.

3. The system of claim 1 further comprising means for adding tags to each said object in said object oriented computing environment which includes one of said corresponding object oriented computing environment attributes.

4. The system of claim 1 wherein said exporting means further comprises means for placing said external data into an output data file.

5. A system for importing and exporting data between an external computing environment operating on one or more computer platforms and an object oriented computing environment operating on one or more computing platforms, said data importing and exporting system comprising:

means for identifying each object in said object oriented computing environment from which data is exported and into which data is imported;

metadata generating means for generating a metadata object for each identified object, said metadata object including conversion parameters for converting attributes of each identified object into a corresponding external data format, said conversion parameters including at least one of default conversion parameters and alternate conversion parameters;

importing means, responsive to a request from said external computing environment to import external data into said object oriented computing environment, for identifying a corresponding metadata object, and for applying the alternate conversion parameters in said corresponding metadata object to said external data if included in said corresponding metadata object, and for applying the default conversion parameters in said corresponding metadata object to said external data in the absence of said alternate conversion parameters in said metadata object, to thereby convert said external data into object oriented data and place said object oriented data into a corresponding data object which is associated with said corresponding metadata object; and exporting means, responsive to a request from said object oriented computing environment to export object oriented data from an object in said object oriented computing environment to said external computing environment, for identifying a metadata object corresponding to said object and for applying the alternate conversion parameters in the corresponding metadata object to said object oriented data if included in said corresponding metadata object, and for applying the default conversion parameters in the corresponding metadata object to said object oriented data from said object in the absence of said alternate conversion parameters in said metadata object, to thereby convert said object oriented data into external data.

6. The system of claim 5 further comprising:

an external object class including external object class methods for importing data, exporting data, and finding objects; and means for causing each identified object to inherit from said external object class, to thereby inherit said external object class methods.

7. The system of claim 5 further comprising means for adding tags to each identified object.

8. The system of claim 5 wherein said exporting means further comprises means for placing said external data into an output data file.

9. A system for importing and exporting data between an external computing environment operating on one or more computer platforms and an object oriented computing environment operating on one or more computing platforms, said object oriented computing environment including datalist objects which list an external computing environment data field name, a corresponding object oriented computing environment attribute and a corresponding external data format for each external data field in the external computing environment which is imported and exported between the external computing environment and the object oriented computing environment, said object oriented computing environment further including a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters, said data importing and exporting means comprising:

importing means, responsive to a request from said external computing environment to import external data into said object oriented computing environment, for identifying an object oriented computing environment attribute from said datalist objects and for identifying a corresponding metadata object, and for applying the alternate conversion parameters in said corresponding metadata object to said external data if included in said corresponding metadata object, and for applying the default conversion parameters in said corresponding metadata object to said external data in the absence of said alternate conversion parameters in said metadata object, to thereby convert said external data into object oriented data and place said object oriented data into a corresponding data object which is associated with said corresponding metadata object; and exporting means, responsive to a request from said object oriented computing environment to export object oriented data from an object in said object oriented computing environment to said external computing environment, for identifying a metadata object corresponding to said object and for identifying said external data name corresponding to said metadata object from said datalist, and for applying the alternate conversion parameters in the corresponding metadata object to said object oriented data from said object if included in said corresponding metadata object, and for applying the default conversion parameters in the corresponding metadata object to said object oriented data from said object in the absence of said alternate conversion parameters in said metadata object, to thereby convert said object oriented data into external data.

10. The system of claim 9 further comprising:

an external object class including external object class methods for importing data, exporting data, and finding objects; and means for causing each said object in said object oriented computing environment which includes one of said corresponding object oriented computing environment attributes, to inherit from said external object class, to thereby inherit said external object class methods.

11. The system of claim 9 further comprising means for adding tags to each said object in said object oriented computing environment which includes one of said corresponding object oriented computing environment attributes.

12. The system of claim 9 wherein said exporting means further comprises means for placing said external data into an output data file.

13. A method for importing and exporting data between an external computing environment operating on one or more computer platforms and an object oriented computing environment operating on one or more computing platforms, said date importing and exporting method comprising the steps of:

generating a datalist which lists an external computing environment data field name, a corresponding object oriented computing environment attribute and a corresponding external data format for each external data field in the external computing environment which is imported and exported between the external computing environment and the object oriented computing environment;

generating a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters;

identifying an object oriented computing environment attribute from said datalist in response to a request from said external computing environment to import said data line said object oriented computing environment:

identifying a corresponding metadata object;

applying the alternate conversion parameters in said corresponding metadata object to said data if included in said corresponding metadata object, and for applying the default conversion parameters in said corresponding metadata object to said external data in the absence of said alternate conversion parameters in said metadata object, to thereby convert said external data into object oriented data; and placing said object oriented data into a corresponding data object which is associated with said corresponding metadata object.

14. The method of claim 13 further comprising the step of:

generating an external object class including external object class methods for importing data, exporting data, and finding objects; and causing each said object in said object oriented computing environment which includes one of said corresponding object oriented computing environment attributes, to inherit from said external object class, to thereby inherit said external object class methods.

15. The method of claim 13 further comprising the step of adding tags to each said object in said object oriented computing environment which includes one of said corresponding object oriented computing environment attributes.

16. The method of claim 13 further comprising the steps of:

identifying an object oriented computing environment attribute from said datalist in response to a request from said external computing environment to import said data into said object oriented computing environment;

identifying a corresponding metadata object;

applying the alternate conversion parameters in said corresponding metadata object to said data if included in said corresponding metadata object, and for applying the default conversion parameters in said corresponding metadata object to said external data in the absence of said alternate conversion parameters in said metadata object, to thereby convert said external data into object oriented data; and placing said object oriented data into a corresponding data object which is associated with said corresponding metadata object.

17. A method for importing and exporting data between an external computing environment operating on one or more computer platforms and an object oriented computing environment operating on one or more computing platforms, said data importing and exporting method comprising the steps of:

generating a datalist which lists an external computing environment data field name, a corresponding object oriented computing environment attribute and a corresponding external data format for each external data field in the external computing environment which is imported and exported between the external computing environment and the object oriented computing environment;

generating a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters;

identifying a metadata object corresponding to said object in response to a request from said object oriented computing environment to export data from an object in said object oriented computing environment to said external computing environment;

identifying said external data name corresponding to said metadata object from said datalist;

applying the alternate conversion parameters in the corresponding metadata object to said data from said object if included in said corresponding metadata object, and for applying the default conversion parameters in the corresponding metadata object to said object oriented data from said object in the absence of said alternate conversion parameters in said metadata object, to thereby convert object oriented data into external data.

18. The method of claim 17 further comprising the step of placing said external data into an output data file.

19. A method for importing data from an external computing environment operating on one or more computer platforms to an object oriented computing environment operating on one or more computing platforms, said object oriented computing environment including datalist objects which list an external computing environment data field name, a corresponding object oriented computing environment attribute and a corresponding external data format for each external data field in the external computing environment which is imported to the object oriented computing environment, said object oriented computing environment further including a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters, said data importing method comprising the steps of:

identifying an object oriented computing environment attribute from said datalist objects in response to a request from said external computing environment to import said data into said object oriented computing environment;

identifying a corresponding metadata object;

applying the alternate conversion parameters in said corresponding metadata object to said external data if included in said corresponding metadata object, and for applying the default conversion parameters in said corresponding metadata object to said external data in the absence of said alternate conversion parameters in said metadata object, to thereby convert said external data into object oriented data; and placing said object oriented data into a corresponding data object which is associated with said corresponding metadata object.

20. A method for exporting data from an object oriented computing environment operating on one or more computing platforms to an external computing environment operating on one or more computer platforms, said object oriented computing environment including datalist objects which list an external computing environment data field name, a corresponding object oriented computing environment attribute and a corresponding external data format for each external data field in the external computing environment which is exported from the object oriented computing environment, said object oriented computing environment further including a metadata object for each object in said object oriented computing environment which includes one of said corresponding object oriented computing environment attributes, said metadata object including conversion parameters for converting the corresponding object oriented computing environment attribute into said corresponding external data format, said conversion parameters including at least one of default conversion parameters and alternate conversion parameters, said data exporting method comprising the steps of:

identifying a metadata object corresponding to an object in response to a request from said object oriented computing environment to export data from the object in said object oriented computing environment to said external computing environment;

identifying said external data name corresponding to said metadata object from said datalist; and applying the alternate conversion parameters in the corresponding metadata object to said data from said object if included in said corresponding metadata object, and for applying the default conversion parameters in the corresponding metadata object to said object oriented data from said object in the absence of said alternate conversion parameters in said metadata object, to thereby convert object oriented data into external data.

\* \* \* \* \*

UNITED STATES PATENT AND TRADEMARK OFFICE
CERTIFICATE OF CORRECTION

PATENT NO. : 5,497,491
DATED : March 5, 1996
INVENTOR(S) : Mitchell, et al.

It is certified that error appears in the above-identified patent and that said Letters Patent is hereby corrected as shown below:

Column 29, line 29, delete "line" and insert --into-- therefor.

Column 29, line 29, after "environment" delete the colon ":" and insert a semicolon -- ; -- .

Signed and Sealed this

Eleventh Day of November, 1997

Attest:

BRUCE LEHMAN

Attesting Officer

Commissioner of Patents and Trademarks